(12) United States Patent
Spriestersbach et al.

(10) Patent No.: US 6,376,102 B1
(45) Date of Patent: Apr. 23, 2002

(54) THERMALLY SPRAYED ANTICORROSION LAYER FOR REINFORCED CONCRETE AND METHOD FOR MAKING THE PREPARATION THEREOF

(75) Inventors: Jochen Spriestersbach, Marl; Michael Knepper, Mülheim a. d. Ruhr; Jürgen Wisniewski, Wesel, all of (DE)

(73) Assignee: Grillo-Werke AG, Duisburg (DE)

( * ) Notice: Subject to any disclaimer, the term of this patent is extended or adjusted under 35 U.S.C. 154(b) by 0 days.

(21) Appl. No.: 09/720,483

(22) PCT Filed: Jun. 23, 1999

(86) PCT No.: PCT/EP99/04352

§ 371 Date: Dec. 27, 2000

§ 102(e) Date: Dec. 27, 2000

(87) PCT Pub. No.: WO00/00659

PCT Pub. Date: Jan. 6, 2000

(30) Foreign Application Priority Data

Jun. 27, 1998 (DE) .......................................... 198 28 827

(51) Int. Cl.[7] ......................... B32B 15/04; B32B 15/00; C23C 4/06

(52) U.S. Cl. ...................... 428/633; 428/615; 428/621; 428/626; 428/633; 428/650; 428/658; 428/699; 427/455

(58) Field of Search .................................. 428/615, 650, 428/651, 658, 659, 621, 626, 633; 427/419.1, 455; 52/515

(56) References Cited

U.S. PATENT DOCUMENTS 5,952,055 A * 9/1999 Brown et al. ............... 427/454

FOREIGN PATENT DOCUMENTS

| DE | 39 40 199 A1 | 6/1991 |
| EP | 2 426 032 | 12/1979 |
| EP | 0 568 025 A3 | 11/1993 |
| EP | 0 591 775 A1 | 4/1994 |

* cited by examiner

*Primary Examiner*—Deborah Jones
*Assistant Examiner*—Jennifer McNeil
(74) *Attorney, Agent, or Firm*—Jacobson Holman, PLLC

(57) ABSTRACT

The method for applying a zinc-based anticorrosion layer for reinforced concrete is characterized in that a layer consists of at least two layers, of which the first layer, directly sprayed on the concrete, is made of pure zinc and the second layer sprayed thereon is made of a zinc/alumimum alloy.

10 Claims, No Drawings

THERMALLY SPRAYED ANTICORROSION LAYER FOR REINFORCED CONCRETE AND METHOD FOR MAKING THE PREPARATION THEREOF

This is a 371 of PCT/EP99/04352, filed Jun. 23, 1999.

The present invention relates to a thermally sprayed zinc-based anticorrosion layer for reinforced concrete and method for the preparation thereof.

The present invention relates to a thermally sprayed zinc-based corrosion layer for reinforced concrete and to a method for the preparation thereof.

Thermally sprayed layers of zinc have long been employed as anodes for the protection of reinforced concrete constructions. The thermally sprayed zinc anode applied to the exterior surfaces of the buildings by thermal spraying methods adopts the function of a corrosion protection of the reinforcing steel. Such an anode can be employed both as a galvanic anode (sacrificial anode) and as an anode in corrosion systems operated with extraneous current. The life of such zinc anodes is critically influenced by the exterior corrosion and the erosion of the sprayed layer.

EP 0 305 914 A2 describes a method for treating rolled steel for increasing its corrosion resistance, a coating of zinc powder being preferably applied thereto. This rolled steel has utility, in particular, in reinforcing steel or steel for prestressed concrete. The rolled steel is coated with the metallic powder at temperatures of below 600° C. directly while still hot from rolling. Then, a coating of an artificial resin, such as epoxy resin, is applied. In this method, the reinforcing steel is protected from corrosive attack directly in the reinforced concrete.

EP 0 668 364 A1 describes aluminum-zinc alloys for cathodic protection of reinforced concrete having zinc contents of from 10% to 50%. A disadvantage of these aluminum-zinc alloys is their low resistance at higher pH values of the concrete of between 11 and 14. Such pH values result in a severe corrosion under the coating which may lead to chipping off of the coating. Pure zinc layers do not exhibit such behavior and are therefore more suitable for direct contact with the concrete surface.

JP 0831159 A describes an aluminum alloy for the corrosion protection of reinforced concrete having a zinc content of 2–7%.

JP 08199279 A describes an alloy for the corrosion protection of reinforced concrete having a zinc content of 7–50%.

EP 0 591 775 A1 describes a method in which a rough epoxy polyamide primer layer is first applied to the concrete surface. Then, an aluminum alloy or a zinc-aluminum pseudo-alloy operated with extraneous current is sprayed onto the primer layer.

JP 6-2174 A describes a method in which a rough primer layer is also applied to the concrete surface. Then, aluminum or an aluminum alloy is sprayed thereon. In addition, a zinc, zinc alloy or zinc pseudo-alloy is applied to this layer. In both methods, the primer layer is necessary since a direct contact of aluminum or aluminum-zinc alloys with the concrete surface is to be avoided.

Thus, it is known that the corrosion resistance of thermally sprayed zinc layers can-be improved by alloying aluminum into the zinc wire, where the aluminum content should be between 2 and 33, preferably from 15 to 22%. This is truer in particular, when zinc layers are to be exposed to a chloride-containing or wet atmosphere, cf. DE 198 11 447 A1.

Such zinc/aluminum alloys can be thermally applied to reinforced concrete surfaces in the same way as layers of pure zinc. However, due to the high pH value of concrete of between 11 and 14, such layers of zinc/aluminum alloys are subject to the above mentioned corrosion under the coating, especially in the aluminum-rich zones. The generated corrosion products have a tendency to expand and form blisters.

This results in a local mechanical weakening and even in local losses of the contact between the concrete electrolyte and the concrete surface.

It has been the object of the invention, on the one hand, to make use of the better corrosion resistance of zinc/aluminum alloys, and on the other hand, to avoid the disadvantages of corrosion under the coating observed with such alloys.

This object has now been achieved by the layer being form ed of at least two layers, of which the first layer, directly sprayed on the concrete, is made of pure zinc and the second layer sprayed thereon later is made of a zinc/aluminum alloy.

The second layer contains from 4 to 33% by weight, preferably from 15 to 22% by w eight, of aluminum. In addition, the properties can be still improved if from 0.002 to 0.04% by weight of indium is alloyed into this zinc/aluminum alloy. Optimum results are achieved when a third layer based on polyurethane at least capable of closing the pores of the second layer is applied on top of the second layer.

The first layer, which is sprayed directly onto the concrete, generally has a layer thickness of from 100 to 400$\mu$m. Subsequently, a sprayed layer of the zinc/aluminum alloy is applied to this surface, for example, using a wire arc or a wire flame spraying method, which latter layer generally has a layer thickness of from 100 to 400$\mu$m. If a low-viscosity polyurethane layer which at least closes the open pores is applied to this second layer, an additional layer thickness of from 50 to 100$\mu$m is produced.

Wire suitable for said applying of the second layer is described, for example, in German Patent Application 198 11 447.8.

A particularly suitable one-component moisture-curing polyurethane resin and its application is described, for example, in EP-A-0 677 592.

What is claimed is:

1. A thermally sprayed zinc-based anticorrosion layer for reinforced concrete, characterized in that said layer consists of at least two layers, of which the first layer, directly sprayed on the concrete, is made of pure zinc and the second layer sprayed thereon later is made of a zinc/aluminum alloy.

2. The thermally sprayed anticorrosion layer according to claim 1, characterized in that said zinc/aluminum alloy contains from 4 to 33% by weight of aluminum.

3. The thermally sprayed anticorrosion layer according to claim 1, characterized in that said zinc/aluminum alloy contains from 15 to 22% by weight of aluminum.

4. The thermally sprayed anticorrosion layer according to claim 1, characterized in that said zinc/aluminum alloy contains from 0.0002 to 0.04% by weight of indium.

5. The thermally sprayed anticorrosion layer for reinforced concrete according to claim 1, characterized in that a third layer based on polyurethane which at least closes the pores of the second layer is present.

6. A method for applying a zinc-based anticorrosion layer for reinforced concrete, characterized in that a first layer of pure zinc is first sprayed onto the concrete, followed by spraying a second layer of a zinc/aluminum alloy.

7. The method according to claim 6, characterized in that the second layer contains from 4 to 33% by weight of aluminum.

8. The method according to claim 6, characterized in that the second layer contains from 15 to 22% by weight of aluminum.

9. The method according to claim 6, characterized in that said zinc/aluminum alloy contains from 0.0002 to 0.04% by weight of indium.

10. The method according to claim 6, characterized in that the pores of the second layer are subsequently closed by a layer based on polyurethane.

* * * * *